US010620972B2

(12) United States Patent
Mattson

(10) Patent No.: US 10,620,972 B2
(45) Date of Patent: Apr. 14, 2020

(54) PROCESSING TOUCH GESTURES IN HYBRID APPLICATIONS

(71) Applicant: Adobe Inc., San Jose, CA (US)

(72) Inventor: Kirk Mattson, Seattle, WA (US)

(73) Assignee: Adobe Inc., San Jose, CA (US)

( * ) Notice: Subject to any disclaimer, the term of this patent is extended or adjusted under 35 U.S.C. 154(b) by 509 days.

(21) Appl. No.: 14/801,616

(22) Filed: Jul. 16, 2015

(65) Prior Publication Data

US 2017/0017386 A1  Jan. 19, 2017

(51) Int. Cl.
*G06F 3/048* (2013.01)
*G06F 9/451* (2018.01)
*G06F 3/038* (2013.01)
*G06F 16/957* (2019.01)

(52) U.S. Cl.
CPC .............. *G06F 9/451* (2018.02); *G06F 3/038* (2013.01); *G06F 16/957* (2019.01)

(58) Field of Classification Search
CPC ............................. G06F 3/0486; G06F 3/0488
See application file for complete search history.

(56) References Cited

U.S. PATENT DOCUMENTS

| 2010/0035658 A1* | 2/2010 | Lee ................... H04M 1/27455 |
| | | 455/566 |
| 2014/0047517 A1* | 2/2014 | Ding ................... H04L 12/1453 |
| | | 726/5 |
| 2014/0143738 A1* | 5/2014 | Underwood, IV ...... H04L 51/38 |
| | | 715/863 |
| 2015/0082239 A1 | 3/2015 | Zhao et al. |
| 2016/0248890 A1* | 8/2016 | McNamara ............. H04L 67/10 |
| 2016/0274786 A1* | 9/2016 | Hernandez .............. G06F 3/017 |
| 2016/0378327 A1* | 12/2016 | Schroeder ............ G06F 3/0482 |
| | | 715/863 |

FOREIGN PATENT DOCUMENTS

| WO | WO 2009/018277 | 2/2009 |
| WO | WO 2013/100990 | 7/2013 |

OTHER PUBLICATIONS

Search Report issued in GB 1608574.8 dated Oct. 20, 2016.

* cited by examiner

*Primary Examiner* — Mohamed Abou El Seoud
(74) *Attorney, Agent, or Firm* — Keller Jolley Preece

(57) ABSTRACT

The present disclosure is directed towards systems and method for receiving and processing user inputs with respect to hybrid computing applications. For example, systems and methods described herein involve detecting one or more user inputs of a touch gesture provided by a user and selectively channeling the one or more user inputs to a non-native element of the hybrid application or a native element of the hybrid application. In particular, the systems and method involve selectively channeling user inputs of touch gestures to prevent instances of input ambiguity with respect to interacting with a graphical user interface associated with the hybrid application.

20 Claims, 7 Drawing Sheets

PROCESSING TOUCH GESTURES IN HYBRID APPLICATIONS

CROSS REFERENCE TO RELATED APPLICATIONS

N/A

BACKGROUND

1. Technical Field

One or more embodiments described herein relate generally to receiving and processing user inputs. More specifically, one or more embodiments relate to receiving and processing user inputs with respect to hybrid computing applications.

2. Background and Relevant Art

Computing devices (e.g., computers, tablets, smart phones), provide numerous ways for people to capture, create, share, view, and otherwise interact with numerous types of digital content. For example, many computing devices allow users to interact with digital content via a touch screen or graphical user interface. Additionally, many computing devices facilitate interaction with digital content via one or more applications.

In facilitating interactions with digital content, many systems combine elements of both native and non-native (e.g., web-based) applications. In particular, many mobile devices make use of hybrid applications that include a native element developed for a particular platform and/or device that can access various functionalities of the computing device (e.g., global positioning system (GPS), camera, address book). In addition to the native element, hybrid applications often include a web element that is generalized for multiple platforms and accessed over a network (e.g., Internet). In this way, a computing device can host or otherwise implement an application within a native element (e.g., a native container) having access to platform specific functions as well as utilizing online capabilities accessible to the computing device.

While hybrid applications provide various improvements over other types of applications, hybrid applications can encounter input ambiguities when receiving and processing user inputs. In particular, hybrid applications may fail to correctly receive or process one or more user inputs causing frustration when interacting with hybrid applications via a graphical user interface. For example, both native elements and web elements of a hybrid application are capable of receiving and processing a touch input via a touchscreen interface. As such, when receiving a touch input that the native element and the web element are both capable of receiving and processing, the hybrid application may misinterpret the touch input by processing multiple inputs rather than an intended single input. Alternatively, rather than incorrectly processing multiple inputs, the web element or the native element may defer to each other and fail to process the touch input altogether. As a result, hybrid applications can fail to accurately interpret an otherwise valid touch input.

In addressing input ambiguity, some operating systems enable communication between the native element and the web element to resolve any unintended ambiguities. For example, where the native element receives a touch input that the native element is incapable of processing, the native element can forward the input to the web element to process the input. Alternatively, the web element can forward an input to the native element to process the input using a similar process. Nevertheless, enabling the native element or the web element to defer processing various touch inputs can result in dead zones where neither the native element nor the web element responds to a touch input. As such, users can experience frustration when interacting with hybrid applications.

Accordingly, there are a number of considerations to be made in receiving and processing user inputs with respect to hybrid applications.

SUMMARY

Embodiments of the present disclosure provide benefits and/or solve one or more of the foregoing or other problems in the art with systems and methods for providing digital content to a user. For example, one or more embodiments include systems and methods for detecting a user input (or multiple user inputs) and channeling the user input to a non-native element of a hybrid application to process the user input. Further, one or more embodiments include systems and methods for receiving an indication that the non-native portion of the application has rejected the user input and channeling the user input to a native portion of the application to process the user input.

Thus, one or more embodiments include features and functionality that enable a user to interact with digital content with respect to a graphical user interface associated with a hybrid application. For example, in response to receiving a user input, a client device can initially channel a user input to a non-native element of the hybrid application and, upon receiving an indication that the non-native element has rejected the user input, channel the user input to the native element of the hybrid application. As such, systems and methods described herein avoid misinterpreting a user input as multiple user inputs and instead provide a single clear and precise response to receiving the user input.

Additionally, one or more embodiments include features and functionality that prevent unwanted dead zones when interacting with digital content provided via a graphical user interface associated with a hybrid application. For example, rather than having the non-native element and the native element of the hybrid application attempt to resolve ambiguity by deferring processing between the different elements of the hybrid application, one or more embodiments avoid ambiguity by channeling a user input to the non-native element. Furthermore, one or more embodiments channel the user input to the native element of the application upon receiving an indication that the non-native element has rejected the user input. As such, one or more embodiments can reduce or eliminate ambiguity as to which element of the hybrid application will defer processing to the other element. Thus, as any user input is initially channeled to a non-native element of the hybrid application. The user input is then channeled to the native element only when the input is rejected by the non-native element. Thus, an author of digital content can have ultimate control over managing user inputs with respect to the digital content regardless of an operating system in use on a particular device.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1:
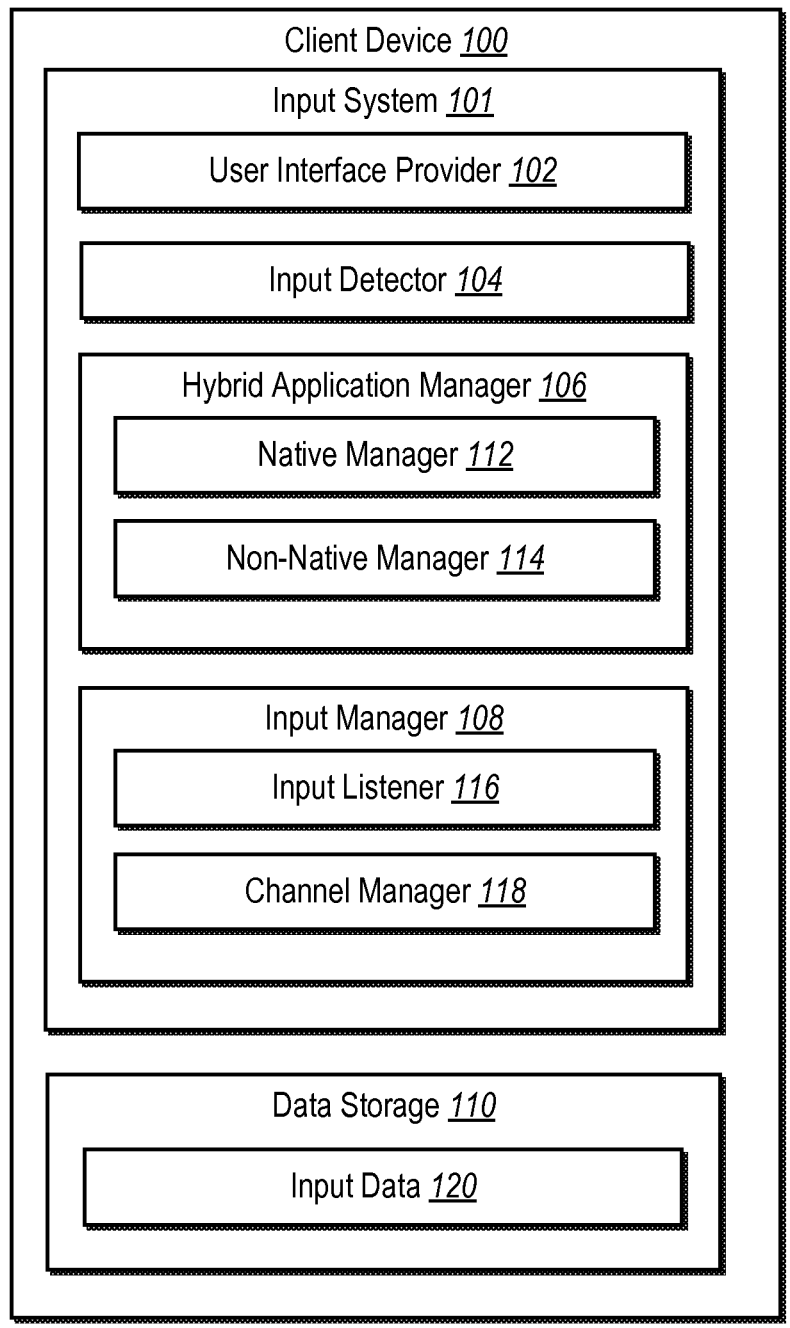
FIG. 1 illustrates a block diagram of a client device for receiving and processing user inputs in accordance with one or more embodiments.

One or more embodiments described herein include an input system that facilitates an enjoyable experience for a user when interacting with a hybrid computing application (or simply "hybrid application"). In particular, the input system can reduce input ambiguity with respect to receiving and processing user inputs provided by a user when interacting with a hybrid application having a native element and a non-native element. For example, in one or more embodiments, the input system detects a user input and channels the user input to the non-native element of the hybrid application. In the cases in which the non-native element of the hybrid application rejects the user input, the input system can channel the user input to the native element of the hybrid application for processing of the user input.

In one or more embodiments, the input system enables a hybrid application to provide a clear and unambiguous response to a single input event (e.g., a touch gesture). In particular, the input system can facilitate providing a single response to a single input event by selectively channeling one or more user inputs to a non-native element and/or a native element of a hybrid application. For example, the input system can detect a touch gesture including a series of inputs and initially channel each input of the touch gesture to the non-native element of the hybrid application as a series of inputs that make up the touch gesture is received. Upon determining that the non-native element has rejected one or more inputs of the touch gesture, the input system can channel any rejected user inputs, in addition to any additional user inputs of the touch gesture, to the native element of the hybrid application. Thus, the input system can avoid providing multiple responses to a single input event by selectively channeling one or more user inputs to respective elements of a hybrid application.

Additionally, one or more embodiments of the input system reduce or prevent unwanted dead zones within a graphical user interface associated with a hybrid application. In particular, the input system avoids dead-zones caused by the non-native element and the native element failing to respond to a particular user input by ensuring that one or both of the non-native element and the native element has an opportunity to receive and process a user input. For example, rather than relying on the native element and the non-native element of the hybrid application to determine which element should receive and process a user input, the input system can initially channel a user input to the non-native element of the hybrid application. Further, in the case that the non-native element of the hybrid application rejects the user input, the input system can channel the user input to the native element. Thus, the input system can give each of the native element and non-native element of the hybrid application an opportunity to respond to the user input without causing confusion in whether the non-native element or the native element should process the user input.

Moreover, in one or more embodiments, the input system enables a creator (e.g., an author) of digital content to have complete control over how user inputs are to be handled by a hybrid application when presenting digital content authored by the user. In particular, by initially channeling a user input or series of user inputs to a non-native element of the hybrid application, the input system ensures that the non-native element of the hybrid application has the initial control over how a user input is received and processed. For example, where the non-native element includes non-native content created by an author and the native element includes a native container on the client device, the input system can initially channel a received user input to the web element to be processed in accordance with instructions included in the non-native content. Thus, when both the native container and the non-native content of the hybrid application are capable of receiving and processing a particular user input, the input system initially channels the user input to the web element to be processed in accordance with instructions created by an author of the non-native content.

As mentioned above, the input system can facilitate receiving and processing one or more user inputs with respect to a graphical user interface presented by a hybrid application. In one or more embodiments, the input system includes an application program interface (API) that operates on a client device in accordance with an opt-in contract that accesses the hybrid application and governs how input is received and channeled to the native and non-native element of the hybrid application. For example, as will be described in greater detail below, an API may listen or otherwise monitor incoming input events and detect one or more user inputs received at the client device. The API can initially channel the user inputs to the non-native element as the user inputs are received. If the non-native element rejects one or more of the user inputs, the non-native element can provide a call to the API indicating that one or more of the user inputs have been rejected. In response, the API can channel the rejected user input(s) and any additional user inputs from a touch gesture or other input event to the native element of the hybrid application.

As used herein, a "hybrid application" refers to an application that includes both a non-native element and a native element. For example, a hybrid application can refer to a software application that provides non-native functionality as well as native functionality of a client device. In one or more embodiments, the hybrid application is a mobile application hosted within a native container stored locally on a mobile device and which utilizes a mobile web view. For example, a hybrid application may include non-native content included within a native application on a mobile device and which utilizes functionality of the mobile device and/or operating system of the mobile device. Thus, the hybrid application can present non-native content within a graphical user interface provided by a native application and which has access to various functionalities offered by the mobile device.

As used herein, a "native element" of a hybrid application may refer to an application or container installed on a client device. In addition, the native element can include features and functionality that are specific to an operating system or platform used on the client device. In one or more embodiments, a native element provides access to features of the client device including, for example, a camera, global positioning system (GPS), an accelerometer, a compass, a list of contacts, and other features provided via the operating system and/or client device. A native element can further incorporate platform specific gestures (or other gestures specific to the native element) that the native element can receive and process. Additionally, a native element can operate with or without access to online content. For example, even without access to online content, the hybrid application can provide functionality associated with the native element without necessarily providing functionality associated with a non-native element of the hybrid application.

As used herein, a "non-native element" of a hybrid application may refer to an application and/or content other than the native element. The non-native element can access and perform functions based on non-native elements. For example, a non-native element can obtain and display non-native content. For example, the non-native element can include online content and a web viewer or web application within which the online content is presented to a user. Alternatively, the non-native element can comprise HTML or other content that does not come to the client device via a network HTTP call. Thus, the non-native content can comprise online HTML content or non-online HTML content. In the case of a hybrid application, the non-native element may be packaged within the native element (e.g., a native container) or accessed online and provided to a user of a client device via a graphical user interface provided by the native element of the hybrid application. In one or more embodiments, the non-native element includes HTML content presented to the user within a graphical user interface on a display area of the client device. Additionally, in one or more embodiments, the non-native element is non-device and non-platform specific. For example, a mobile device (or other client device) can access and provide online HTML content within a platform neutral web browser on any mobile device having access to online content.

As used herein, "input event" or "user interaction" may be used interchangeably to refer to one or more user inputs (or simply "inputs") provided by a user with respect to a graphical user interface. In particular, an input event or user interaction can refer to a single user input or combination of user inputs received from a user by way of one or more input devices. In one or more embodiments, an input event refers to one or more user inputs received by a user device via a touch screen. As an example, an input event can refer to a touch gesture including a single input (e.g., a tap gesture) received by a client device. Alternatively, an input event can refer to a touch gesture that includes a series of multiple inputs (e.g., a swipe gesture). Additionally, in one or more embodiments, an input event includes multiple associated touch gestures. Examples of touch gestures that make up an input event can include, but are not limited to, swipe gestures, tap gestures, pinch gestures, reverse pinch gestures or other types of user input provided with respect to a graphical user interface via a touch screen. Moreover, while one or more embodiments described herein refer to input events that include user inputs that are received or otherwise detected with respect to a touch screen interface, it is appreciated that an input event can refer to any series of one or more user inputs received with respect to a graphical user interface provided to a user via a display area of a client device.

As used herein, "digital content" refers to any digital data. For example, the term digital content can include a defined portion of digital data (e.g., a data file). Examples of digital content can include digital images, digital video, electronic document files of all types, streaming content, contact lists, web content, and/or folders that include any type of digital content. Additionally, digital content may refer to any digital content provided to a user on a graphical user interface via a display area on a client device. In one or more embodiments, digital content is provided to a user via a native element of a hybrid application. Additionally or alternatively, digital content can be provided to a user via a non-native element of the hybrid application.

Additional features and characteristics of one or more embodiments of an input system are described below with respect to the Figures. For example, FIG. 1 illustrates a block diagram of an example embodiment of a client device 100 including an implementation of an input system 101 in accordance with one or more principles described herein. As shown in FIG. 1, the input system 101 can include a user interface provider 102, an input detector 104, and a hybrid application manager 106 that includes a native manager 112 and a non-native manager 114. As shown in FIG. 1, the input system 101 further includes an input manager 108, which includes an input listener 116 and a channel manager 118. Additionally, as shown in FIG. 1, the client device 100 includes a data storage 110 that includes input data 120. One or more components 102-108 of the input system 101 are provided via a platform or operating system on the client device 100. Additionally or alternatively, one or more components 102-108 of the input system 101 are installed on the client device 100 and operate in connection with a platform or operating system running on the client device 100.

Generally, the client device 100 can include any one of various types of client devices. For example, the client device 100 can be a mobile device (e.g., a smart phone), tablet, laptop computer, desktop computer, or any other type of computing device as further explained below with reference to FIG. 6. Additionally, the client device 100 can include one of various types of user interfaces. In one or more embodiments, the client device 100 includes a touch screen interface with which a user may interact. Further, the client device 100 can communicate with other devices using any communication platforms and technologies suitable for transporting data and/or communication signals, including any known communication technologies, devices, media, and protocols supporting of remote data communications.

Each of the components 101-120 of the client device 100 may be in communication with one another using any suitable communication technologies. In addition, although components 101-120 are shown separately in FIG. 1, any of the components 101-120 may be combined into fewer components, such as into a single component, or divided into more components as may serve a particular embodiment. In addition, the components 101-120 may be located on, or implemented by, one or more computing devices, such as one or more client devices or server devices. For example, one or more features and functionality described in connection with the input system 101 and/or data storage 110 on the client device 100 may also apply to similar components on a server device or provided via a web component.

Each of the components 101-120 can comprise software, hardware, or both. For example, each of the components 101-120 can comprise one or more instructions stored on a computer-readable storage medium and one or more processors of one or more computing devices to execute instructions. When executed buy one or more processors, the computer-executable instructions cause the computing device to perform the methods described herein. Alternatively, the components 101-120 can comprise hardware, such as a special purpose processing device to perform a certain function or group of functions.

As an initial overview of one or more embodiments of the client device 100 and the input system 101, the client device 100 can implement an input system 101 that facilitates receiving and processing user inputs (e.g., touch inputs) received from a user. In particular, the input system 101 can facilitate presentation of a graphical user interface associated with a hybrid application within a display area on the client device. Additionally, the input system 101 can provide one or more interactive features within the graphical user interface with which the user may interact and provide user inputs to the client device 100. Further, the input system 101 can process one or more received user inputs in accordance with principles described herein. For example, the input system 101 can receive and process one or more touch inputs as described herein to reduce instances of user input ambiguity and improve upon the user experience with respect to interacting with hybrid applications on a touchscreen interface.

As mentioned above, and as shown in FIG. 1, the input system 101 includes a user interface provider 102. The user interface provider 102 provides a graphical user interface (or simply "user interface") that allows a user to navigate, browse, share, manage, and/or otherwise experience digital content using the client device 100. For example, the user interface provider 102 provides a user interface that facilitates a presentation of digital content on the client device 100 (e.g., a display screen) or a display device coupled to or otherwise associated with the client device 100. Likewise, the user interface provider 102 provides a user interface that facilitates viewing and interacting with digital content provided via the client device 100. For example, the user interface provider 102 can provide a user interface that allows a user to interact with digital content through one or more touch gestures or other types of user inputs.

More specifically, in one or more embodiments, the user interface provider 102 provides a user interface associated with a hybrid application having a native element and a non-native element. In particular, the user interface provider 102 can provide content associated with a non-native element within a native container (e.g., a native element). For example, the user interface provider 102 provides a user interface that includes web content presented within a native container. Additionally, the user interface provider 102 can facilitate presentation of other types of digital content (e.g., audio, videos, webpages, documents) depending on a particular application of the hybrid application manager 106.

As further illustrated in FIG. 1, the input system 101 includes a user input detector 104 that detects, identifies, and/or receives a user interaction and translates the user interaction into a user input (e.g., a user command or request). For example, the user input detector 104 can detect a user interaction from a keyboard, mouse, screen, or any other input device as part of or in communication with the client device 100. In the event a touch screen is used as an input device, the user input detector 104 detects one or more touch gestures (e.g., swipe gestures, tap gestures, punch gestures, reverse pinch gestures) that a user provides via the touch screen. In one or more embodiments the user provides one or more touch gestures in relation to and/or directed at interactive features provided via a user interface associated with a hybrid application. The user input detector 104 additionally, or alternatively, receives data representative of a user interaction. For example, the user input detector 104 can receive one or more user configurable parameters from the user, one or more user commands from the user, and/or other suitable user input.

The user interface provider 102 can utilize user input and/or other data received from the user input detector 104 to manage, control, and/or facilitate the use of a user interface. In general, in response to the user input detector 104 detecting one or more user interactions, the user interface provider 102 can provide a user interface that allows a user to view, search, edit, share, navigate, and/or otherwise experience digital content while avoiding user input ambiguity due to misinterpretation of user interactions. For example, in response to the user input detector 104 detecting a touch gesture, the user interface provider 102 may facilitate user interaction with digital content presented via the user interface in accordance with one or more features of a hybrid application.

As mentioned above, and as illustrated in FIG. 1, the input system 101 further includes a hybrid application manager 106 including a native manager 112 and a non-native manager 114. In one or more embodiments, the native manager 112 allows for a native element of a hybrid application to respond to user input. For example, the native manager 112 can comprise the native container, a viewer, or other container of the client device. The non-native manager 114 allows for a non-native element of the hybrid application to respond to user input. For example, the non-native manager 114 can comprise an operating system WebView, a web thread, a WebKit, or in some cases the non-native content. It is worth noting that the non-native manager 114 can comprise native components built to display non-native content, such as HTML content. As an example, the hybrid application manager 106 may include a hybrid application that includes a web application embedded or otherwise contained within a native application installed on the client device 100. Further, while the input system 101 illustrates a single hybrid application manager 106 that includes or manages a hybrid application, one or more embodiments of the input system 101 include multiple application managers and/or a single hybrid application manager 106 that includes different types of hybrid applications.

To illustrate, the hybrid application manager 106 can include a presentation application that provides online digital content (e.g., HTML content) to a user within a graphical user interface provided via a native element of the hybrid application. As will be described in greater detail below, the hybrid application manager 106 can provide digital content including one or more interactive features provided to a user via a graphical user interface. For example, the hybrid application manager 106 can provide a presentation of photos, videos, or other digital content that includes hyperlinks, input icons, or other graphical features that enable a user to interact with the digital content via a graphical user interface associated with the hybrid application. Nevertheless, while one or more embodiments described herein relate specifically to a presentation application for presenting photos or videos (e.g., a slideshow) within a graphical user interface, it is appreciated that features and functionality described with respect to a presentation application also apply to other types of hybrid applications. As an example, one or more features described with respect to an HTML slideshow or other digital content hosted on a mobile application can similarly apply to a gaming application having a native element and non-native element. For example, the gaming application can include an online gaming application that is hosted on a local application installed on the client device.

As mentioned above, the hybrid application manager 106 can include a native manager 112 and a non-native manager 114. In one or more embodiments, the native manager 112 and the non-native manager 114 provide a presentation of digital content to a user of the client device 100. Additionally, as will be described in greater detail below, the native manager 112 and the non-native manager 114 can facilitate receiving and processing user inputs received at the client device 100 (e.g., via a touchscreen interface).

As mentioned above, the native manager 112 and the non-native manager 114 may cooperate to provide a presentation of digital content to a user of a client device 100. For example, in one or more embodiments, the native manager 112 can provide a graphical user interface including digital content accessed online or provided from data stored on the client device 100. As an example, where the native element of the hybrid application includes a native application installed on the client device 100, the native manager 112 can provide a presentation of digital content including content accessed locally on the client device 100. For instance, the native manager 112 can access contact information or other data stored on the client device 100 (e.g., without accessing a remote server) and provide the contact information or other data to the user via a graphical user interface associated with the native element of the hybrid application. Additionally, the native manager 112 can access online content (e.g., HTML content) associated with the non-native element of the hybrid application and provide the online content within the graphical user interface.

In addition to providing digital content via a graphical user interface, the native manager 112 can also access features and functionality of the client device 100 in performing one or more functions of the hybrid application. For example, the native manager 112 can access a camera, a global positioning system (GPS), an accelerometer, a compass, or other functionalities provided by the client device 100. Additionally, the native manager 112 can access functionality provided by a device platform and/or operating system running on the client device 100.

As mentioned above, the non-native manager 114 can facilitate a presentation of digital content on the client device. For example, the non-native manager 114 can provide online digital content or other remotely accessed content via the client device 100 on a graphical user interface associated with the hybrid application. In one or more embodiments, the non-native manager 114 accesses HTML content and provides the HTML content via a web viewer on a display area of the client device 100. Additionally or alternatively, the non-native manager 114 accesses HTML content or other digital content and provide the digital content within a graphical user interface presented by the native manager 112. Thus, from the perspective of a user, the presentation of digital content may include online content accessed via the non-native manager 114 and provided within a graphical user interface window. As such, while the native element may contribute to presenting digital content within a graphical user interface, the presentation by the hybrid application may have a similar or identical appearance to a user as a web application without a native element.

In addition to providing digital content to a user via a graphical user interface, the native manager 112 and/or the non-native manager 114 can facilitate receiving and processing user inputs received at the client device 100. For example, the native manager 112 and/or the non-native manager 114 can receive and process one or more touch gestures that make up an input event received by the client device 100. Additionally, while the native manager 112 and the non-native manager 114 may each have the capability to independently receive and process user inputs, one or more embodiments of the hybrid application manager 106 coordinate with an input manager 108 to selectively process one or more user inputs from a series of inputs using either the native manager 112 or the non-native manager 114.

As illustrated in FIG. 1, the client device 100 includes an input manager 108 that facilitates receiving and processing user inputs in accordance with one or more embodiments described herein. In particular, the input manager 108 may coordinate with the hybrid application manager 106 to clearly and precisely respond to a detected input event and avoid input ambiguity with respect to user inputs that the native manager 112 and the non-native manager 114 may process differently. For example, as will be described in additional detail below, the input manager 108 may detect one or more user inputs and selectively channel the user inputs to one of a native element or a non-native element of the hybrid application.

As shown in FIG. 1, the input manager 108 includes an input listener 116. The input listener 116 can monitor user inputs received by the client device 100 and detect or otherwise identify a series of received user inputs. In one or more embodiments, the input listener 116 detects each user input of a series of user inputs as each user input of the series of user inputs is received. For example, where a user provides a touch gesture that includes multiple user inputs, the input listener 116 can detect or otherwise identify each user input of the touch gesture as the touch gesture is received by the client device 100. Additionally, in one or more embodiments, the input listener 116 monitors and detects which user inputs of the series of user inputs has been received and processed via the non-native element and/or the native element of the hybrid application.

As illustrated in FIG. 1, the input manager 108 further includes a channel manager 118 that determines whether to channel one or more user inputs to a native element or a non-native element of a hybrid application. For example, the channel manager 118 may determine to channel one or more inputs of an input event for handling by the non-native element of the hybrid application over a first channel (e.g., the non-native manger 114), or alternatively, for handling by the native element of the hybrid application over a second channel (e.g., the native manager 112).

Upon determining whether to channel the inputs for handling by the native or non-native element, the input manager 118 can channel the one or more user inputs appropriately. In particular, the channel manager 118 can facilitate channeling one or more user inputs by routing, directing, or otherwise providing incoming user inputs for handling by one of the native element or the non-native element of the hybrid application. In one or more embodiments, the input manager 118 channels the user inputs for handling by only one of the non-native element or the native element of the hybrid application. For example, if the input manager 118 channels a series of user inputs for handling by the non-native element, the input manager 118 may additionally prevent any of the series of user inputs from being provided to the native element of the hybrid application. In such instances, only one of the native element and the non-native element receives and processes a response to each user input within a series of user inputs.

Additionally, in one or more embodiments, the channel manager 118 causes the hybrid application manager 106 to implement an integrated reaction to a series of user inputs. In particular, the channel manager 118 can cause the non-native manager 114 and the native manager 112 to each respond to different user inputs that make up an input event. For example, while the channel manager 118 may channel each of a series of user inputs to only one of the non-native element and the native element, the channel manager 118 may channel different portions of the series of user inputs to the different elements of the hybrid application. As will be explained in greater detail below, the channel manager 118 may channel a first plurality of a series of user inputs to the non-native element while preventing any of the first plurality of the series of user inputs from being provided to the native element. Additionally, the channel manager 118 may channel a second plurality of the series of user inputs to the native element while preventing any of the second plurality of the series of user inputs from reaching the non-native element.

In one or more embodiments, the input manager 108 includes an application program interface (API) and/or JavaScript that operates on the client device 100 in accordance with an opt-in contract. In particular, the input manager 108 may operate on the client device 100 and govern how user inputs are received and channeled to various applications on the client device 100. For example, the input manager 108 may include an API that the hybrid application manager 106 calls in various circumstances, such as when the non-native element and/or the native element rejects a particular user input or series of user inputs. Additionally, the input manager 108 may include or have access to a database of user inputs or predefined touch gestures that the input manager 108 and/or hybrid application manager 106 utilized in providing various responses to incoming user inputs.

Additionally, as shown in FIG. 1, the client device 100 can include a data storage 110 including input data 120. In particular, the input data 120 may include any information associated with various input events. In one or more embodiments, the input data 120 includes information associated with various touch gestures that the hybrid application manager 106 and/or input manager 108 accesses and identifies a touch gesture corresponding to an incoming or received series of inputs. For example, when the input system 101 receives one or more inputs of a series of user inputs, the native manager 112 can access input data 120 stored on the client device 100 and draw from a storage of various touch gestures that the native manager 112 is capable of receiving and processing. In one or more embodiments, the native manager 112 has access to the data storage 110, while the non-native manager 114 does not have access to the data storage 110. Additionally, in one or more embodiments, the input manager 108 accesses input information 120 to determine or otherwise identify a particular input event (e.g., a touch gesture) corresponding to a series of received user inputs.

Figure 2:
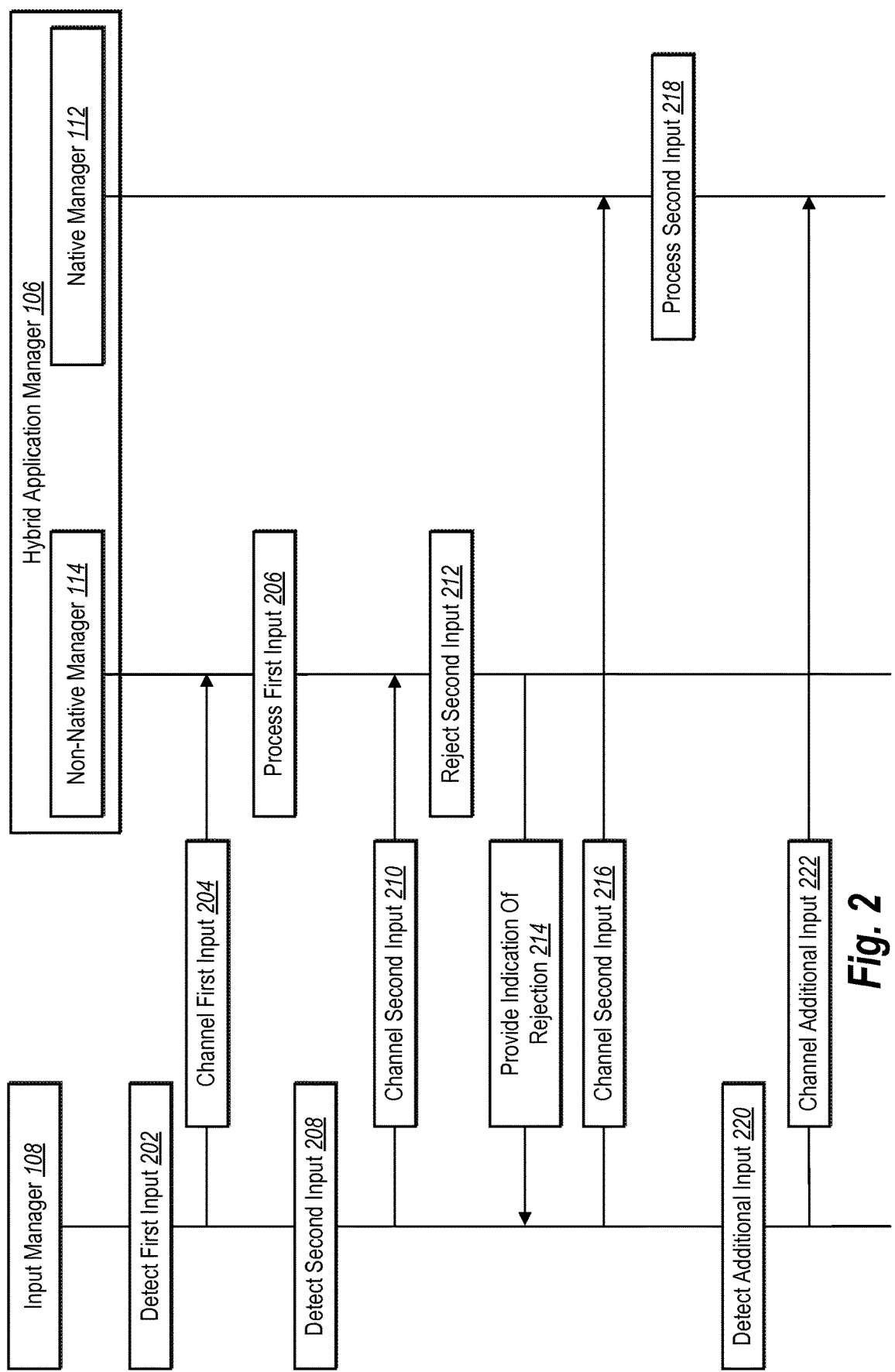
FIG. 2 illustrates a flow diagram of interactions between an input manager and hybrid application manager in accordance with one or more embodiments.

FIG. 2 illustrates a flow diagram of interactions between a hybrid application manager 106 and an input manager 108. In particular, FIG. 2 shows one example embodiment in which the input manager 108 coordinates with a non-native manager 114 and the native manager 112 to clearly and precisely respond to a received input event including any number of user inputs. In particular, FIG. 2 illustrates that an input gesture is received at a client device 100 and processed in accordance with principles described herein.

As illustrated in FIG. 2, the input manager 108 detects 202 a first input. In particular, as mentioned above, the input manager 108 can include an input listener 116 that monitors incoming user inputs and detects a first input of an input event. The first input can refer to a first user input in a series of user inputs that make up an input event. For example, where an input event refers to a touch gesture, the first input may refer to an input received when a finger, stylus, or other object comes into contact with a touchscreen on the client device 100 initiating the touch gesture. In the case of a tap gesture or other single-input touch gesture; the first user input may mark the beginning and end of an input event. Alternatively, in the case of a swipe gesture or other touch gesture that includes multiple incremental inputs, the first input may refer the initial contact that initiates the touch gesture or input event.

Upon detecting the first input, the input manager 108 channels 204 the first input to the non-native manager 114 (e.g., for handling by the non-native element) of the hybrid application manager 106. In particular, the input manager 108, upon detecting the first input, initially channels the first input to the non-native element of the hybrid application. Upon receiving the first input, the non-native element begins processing a response to an input event that includes the first input. In one or more embodiments, the input manager 108 channels the first input to the non-native manager 114 without consideration as to whether the non-native manager 114 is better equipped than the native manager 112 (e.g., the native element) to process the particular user input or an input event including the first input. As such, the input manager 108 initially channels, routes, or otherwise provides the first input of a series of inputs to the non-native manager 114. Additionally, in one or more embodiments, channeling the first input to the non-native manager 114 further includes preventing the native manager 112 from receiving the first input.

As shown in FIG. 2, upon receiving the first input, the non-native manager 114 processes 206 the first input. For example, in the case of a touch gesture, the non-native manager 114 can begin responding to the first input corresponding to a finger or other object coming into contact with a touch screen interface. In one or more embodiments, the non-native manager 114 provides a visual indication via a graphical user interface of the response to the first input.

The input manager 108 may further detect 208 a second input. In particular, the input listener 116 detects the second input in a series of user inputs that make up an input event. The first and second inputs may refer to sequential user inputs in a series of user inputs detected by the input listener 116. For example, where the input event includes a touch gesture in which the user's finger is in continuous contact with a touchscreen interface, the first and second inputs may refer to incremental user inputs that the input listener 116 samples over predefined periods of time. For instance, the input listener 116 may detect or identify a placement of a finger or other object in contact with a touchscreen of the client device 100 multiple times per second. Thus, the user inputs may refer to each captured position of a finger with respect to a display interface. Alternatively, rather than detecting user inputs over predefined time increments, the input listener 116 detects each change in a position of a finger or other object with respect to the display interface. As such, each input of the series of inputs may refer to each change in position of a finger or other object with respect to the touchscreen interface.

Upon detecting the second input, the input manager 108 channels 210 the second input to the non-native manager 114. In particular, the input manger 108 channels the second input to the non-native manager 114 using the same channel used to channel the first input to the non-native manager 114. Additionally, while FIG. 2 illustrates one embodiment in which only two inputs are channeled to the non-native manager 114, it is appreciated that the input manager 108 can channel any number of sequential inputs detected by the input manager 108 to the non-native manager 114.

The non-native manager 114 may reject one or more user inputs. For example, as shown in FIG. 2, the non-native manager 114 rejects 212 the second input of the series of user inputs received by the non-native manager 114. In one or more embodiments, the non-native manager 114 rejects the second input based on a combination of the second input and the first input. For example, the combination of the first input and the second input may make up an invalid touch gesture (or portion of an invalid touch gesture) that the non-native manager 114 rejects or otherwise determines not to process. Alternatively, in one or more embodiments, the non-native manager 114 rejects the second input independent from the first input. For example, as shown in FIG. 2, the non-native manager receives and processes the first input and rejects the second input independent from the first input.

Upon rejecting the second input, the non-native manager 114 can provide 214 an indication of the rejection to the input manager 108. Additionally, in one or more embodiments, the non-native manager 114 provides an indication or otherwise identifies each user input that the non-native element has rejected. For example, where the non-native element has received and processed a response for the first input, but failed to receive and process a response for the second input, the non-native manager 114 provides an indication that only the second input was rejected. Alternatively, the non-native element 14 may provide an indication of any number of additional inputs that the non-native element has rejected 112.

The non-native manager 114 may reject one or more user inputs under various circumstances. As an example, a non-native element may fail to respond to a user input or series of user inputs provided to the non-native element. For instance, a touch gesture may include an interaction of a user with an area on a touchscreen interface where the non-native element has no predefined response (e.g., a dead zone). In this case, the non-native element may simply provide no response to a detected touch gesture. The non-native manager 114 may react by providing an indication or notification of the non-response of the non-native manager 114 to respond to the received user input. Additionally, in one or more embodiments, the non-native manager 114 may communicate to the input manager 108 that the rejection is due to the non-native manager 114 failing to respond to one or more inputs.

Additionally, even where the non-native manager 114 may respond to one or more individual user inputs received within a particular region of a graphical user interface, a received input or series of inputs may fail to correspond to one or more predefined touch gestures that the non-native manager 114 is equipped to receive and process. In particular, the non-native manager 114 may have the capability to respond to one or more basic touch gestures, but not include the capability to respond to more complex touch gestures. As an example, the non-native manager 114 may have the capability to respond to one or more single-finger touch gestures (e.g., tap gesture, swipe gesture), but not have the capability to respond to one or more multi-finger touch gestures (e.g., double-tap gesture, pinch gesture, reverse-pinch gesture). As such, where the input manager 108 detects a multi-finger touch gesture and channels inputs of the multi-finger touch gesture to the non-native manager 114, the non-native element may reject the touch gesture. Then the non-native manager 114 can provide an indication of the rejection to the input manager 108.

In one or more embodiments, the non-native manager 114 rejects one or more user inputs by relinquishing control of the user input(s) based on instructions associated with digital content presented via the hybrid application. For example, where the hybrid application facilitates a presentation of HTML content, an author of the HTML content may intend for a native element of a hybrid application to handle a particular user input or series of user inputs rather than the non-native element. The author may indicate this intent within the HTML content by including instructions that the native element should process a particular input or series of inputs as opposed to the non-native element of the hybrid application. As such, when the non-native manager 114 detects a particular touch gesture and the HTML content includes instructions that the non-native manager 114 relinquish control of the particular touch gesture to the native manager 112, the non-native manager 114 can reject the touch gesture by providing an indication of the relinquished control of the inputs to the input manager 108.

In each of the cases that the non-native manager 114 rejects one or more user inputs, the non-native manager 114 can provide the indication of the rejection to the input manger 108 in addition to information associated with the rejected input. For example, where the non-native manager 114 has processed one or more inputs of an input event, but failed to process additional inputs of the input event, the non-native manager 114 may further provide information indicating which of the inputs have been processed via the non-native manager 114 and which of the inputs have been rejected. Alternatively, in one or more embodiments, the input manager 108 monitors incoming user inputs and detects or otherwise determines which inputs of an input event have been processed by the non-native manager 114 and which inputs have not been processed by either the non-native manager 114 or the native manager 112.

Upon receiving an indication that the non-native manager 114 has rejected one or more user inputs, the input manager 108 may implement an integrated reaction to the series of user inputs. In particular, where the non-native manager 114 receives and processes one or more responses to user inputs of an input event (e.g., the first input), the input manager 108 may channel one or more rejected inputs and/or additional inputs of the input event to the native element of the hybrid application. For example, as shown in FIG. 2, the input manager 108 channels 216 the second input to the native manager 112. As mentioned above, the input manager 108 may channel the second input to the native manager 112 on a different communication channel from the communication channel used to channel the first and second input to the non-native manager 114. Alternatively, the input manager 108 can channel the second input to the native manager 112 using the same communication channel as the communication channel used to channel the first and second inputs to the non-native manager 114.

In one or more embodiments, the non-native manager 114 implements an integrated reaction to the series of user inputs by channeling one or more inputs of the series of user inputs in accordance with a current input state stored on the client device 100. For example, an initial input state may indicate a destination of any incoming inputs to the non-native manager 114. When the input manager 108 receives an indication of the rejection, the input manager 108 may change the input state to indicate a destination of any incoming inputs to the native manager 112. Additionally, upon detecting a completion of an input event, the input manager 108 can change the input state back to a default state (e.g., the input state indicating a destination of incoming inputs to the non-native manager 114). As such, the input manager 108 may respond to incoming inputs by channeling the incoming inputs in accordance with a current input state stored on the client device 100 (e.g., on the data storage 110).

Additionally, where the input manager 108 has channeled one or more inputs to the native manager 112, the input manager 108 may continue channeling additional inputs to the native manager 112 throughout the input event. In particular, once the input manager 108 switches from channeling inputs to the non-native manager 114 to the native manager 112, the input manager 108 can continue channeling detected inputs of the input event to the native manager 112. For example, as shown in FIG. 2, the input manager 108 can detect 220 an additional input. The additional input may be part of the same touch gesture or the same input event as the first input and the second input. Additionally, as shown in FIG. 2, the input manager 108 channels 222 the additional input to the native manager 112. In one or more embodiments, the input manager 108 channels the additional input and any other additional inputs of the input event to the native manager 112.

Further, while one or more embodiments described herein relate to determining mid-gesture or after receiving a first plurality of user inputs whether the input manager 108 should switch from channeling to the non-native manager 114 to the native manager 112, it is appreciated that the input manager 108 may facilitate channeling to the native manager 112 at the onset of a touch gesture. As an example, HTML content may indicate that any possible touch gesture that originates at a certain point on a touchscreen interface should be received and processed by a native container (e.g., a viewer) rather than the HTML content. As such, at the onset of the received user input, the HTML content can immediately notify the input manager 108 that the initial input and any additional user inputs should be channeled to the native container. As such, in one or more embodiments, the native manager 114 processes a response to the entire touch gesture rather than implementing an integrated response that includes responses from both the native manager 112 and the non-native manager 114.

While not explicitly shown in FIG. 2, the input manager 108 can determine that a user input marks the end of an input event and channel the last input of the input event to the native element (e.g., where the input manager 108 has previously switched from channeling from the non-native manager 114 to the native manager 112 for the input event).

Upon determining the end of the input event, the input manager 108 can monitor incoming user inputs to detect one or more additional inputs that signal the beginning of a new input event (e.g., a new touch gesture). Upon detecting a new input event (e.g., receiving a new input within a series of new inputs), the input manager 108 can revert back to channeling the new input and any additional inputs of the new input event to the non-native manager 114 until the new input event is complete or until the non-native manager 114 provides an indication that the non-native manager 114 has rejected one or more inputs of the new input event.

Figure 3A:
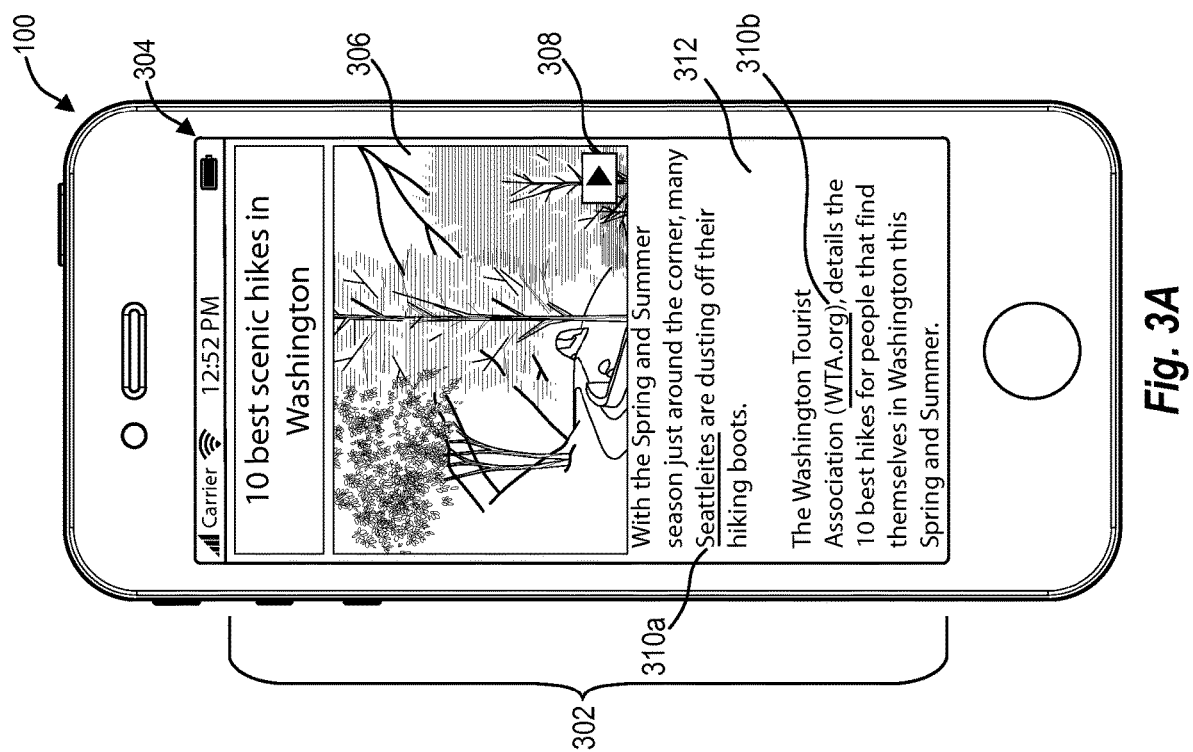
FIG. 3A illustrates a graphical user interface showing a presentation of digital content in accordance with one or more embodiments.
Figure 3B:
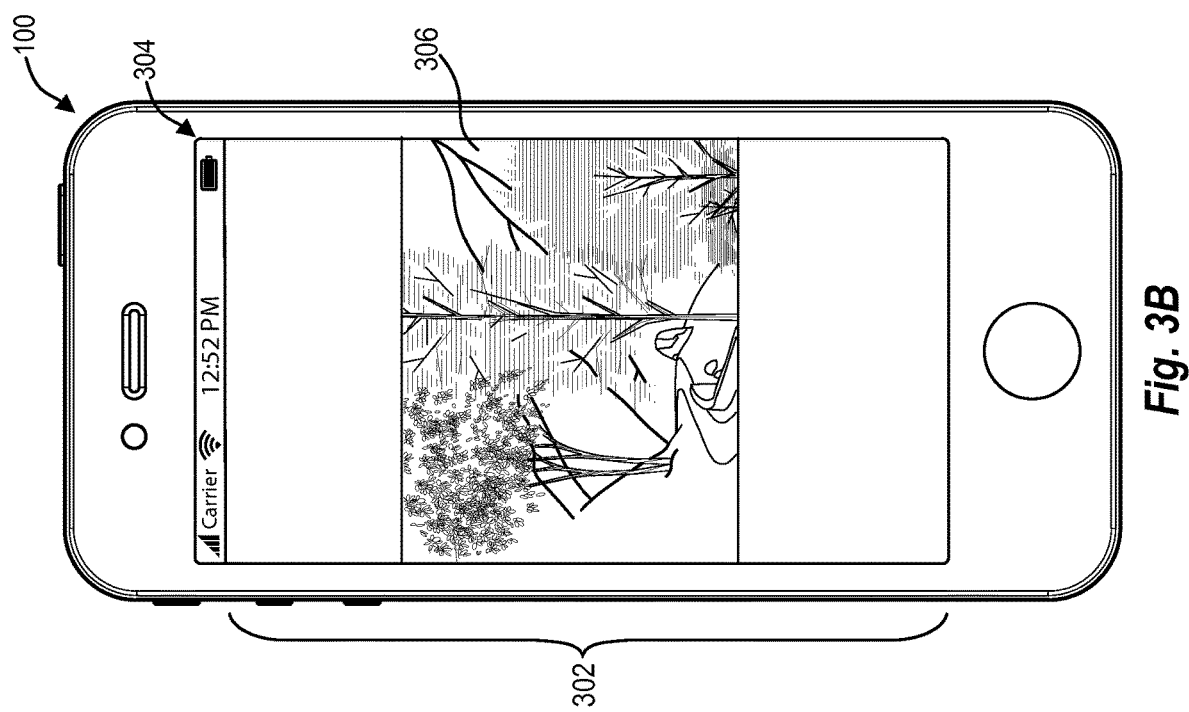
FIG. 3B illustrates a graphical user interface showing a presentation of digital content in accordance with one or more embodiments.

FIG. 3A illustrates an example client device 100 including a graphical user interface provided via a touchscreen interface. In particular, FIG. 3A illustrates an example client device 100 that may implement one or more features and functionalities described above in connection with FIGS. 1 and 2. As shown in FIG. 3A, the client device 100 comprises a touch-screen enabled hand-held device (e.g., a device sized and configured to be held and used in a single hand of a user). As discussed below in reference to FIG. 6, other client devices (e.g., tablets, laptops, etc.) can implement the features and methods of various embodiments. Additionally, while one or more embodiments described herein are described in terms of receiving and processing user inputs received by way of a touchscreen interface, it is appreciated that the client device 100 can receive and process inputs other than via touch gestures and other touch-based inputs. Thus, the use of a touch-screen enabled hand-held device, and particularly a mobile phone, in FIGS. 3A-3B is to aid in the description of various features and methods of one or more embodiments.

As shown in FIG. 3A, the client device 100 can provide or display a presentation of digital content 306 via a graphical user interface 302. More specifically, as illustrated in FIG. 3A, the graphical user interface 302 displays digital content including a magazine article entitled "10 Best Scenic Hikes in Washington." Additionally, in one or more embodiments, the client device 100 provides a presentation of the digital content 306 via a touchscreen 304 capable of receiving user inputs via touch gestures provided by a user that places a finger, stylus, or other object in contact with the touchscreen 304. It is appreciated that the client device 100 can receive and process any number and various types of touch gestures. Additionally, it is appreciated that the client device 100 can receive and process various user inputs with respect to different types of hybrid applications. As such, the following description with respect to receiving and processing user inputs with respect to the graphical user interface illustrated in FIGS. 3A-3B are provided by way of example and may be implemented with respect to other embodiments described herein.

In one or more embodiments, the client device 100 provides the presentation of the digital content 306 using a hybrid application having a native element and a non-native element. For example, the client device 100 can provide a presentation of an article that includes online HTML content via a web viewer that is packaged and/or presented via a native container (e.g., a magazine reader application) installed on the client device 100. As such, the client device 100 utilizes a hybrid application designed for providing a presentation of one or more magazine articles including HTML content (e.g., the non-native element) accessed online and packaged within a native container (e.g., the native element) that is capable of accessing features and functionality local to the client device 100 and/or operating system on the client device 100.

Additionally, the client device 100 can provide various interactive features via the graphical user interface 302 and the touchscreen 304. For example, as shown in FIG. 3A, the graphical user interface 302 may include a display of one or more selectable icons 308. In one or more embodiments a user can tap the selectable icon 308 to provide a slideshow of one or more images included within the digital content 306. Additionally, as shown in FIG. 3A, the graphical user interface 302 may include one or more hyperlinks 310*a-b* that a user can select and cause the client device 100 to access additional online content and/or perform various functions. For example, selecting a first hyperlink 310*a* that reads "Seattleites" may cause the client device 100 to access a definition (e.g., via an online dictionary or dictionary stored on the client device 100) for "Seattleites." As another example, selecting a second hyperlink 310*b* that reads "WTA.org" may cause the client device 100 to navigate to the website WTA.org via a web viewer.

In one or more embodiments, a user may interact with the digital content 306 using various touch gestures. Additionally, the client device 100 can include an input system 101 including similar features and functionality described above in connection with FIGS. 1-2. In particular, upon receiving one or more user inputs with respect to the graphical user interface 302 associated with the hybrid application (e.g., the magazine application), the input system 101 can facilitate providing the user inputs to either a non-native element of the hybrid application or a native element of the hybrid application to processing a response to the received user inputs.

As a first example, if a user wants to scroll through and read a magazine article entitled "10 Best Scenic Hikes in Washington," the user may swipe up across the touchscreen 304 using a finger. In responding to this swipe up touch gesture, the input manager 108 may detect a first user input of the touch gesture corresponding to the initial contact of the user's finger coming into contact with the touchscreen 304. The input manager 108 may initially channel the first user input to the HTML content (e.g., the non-native element). Additionally, the input manager 108 may continue channeling each incremental input that makes up the swipe up touch gesture to the HTML content where the HTML content is equipped to handle the swipe up touch gesture and scroll through the magazine article.

As another example, if a user wants to select one or more of the hyperlinks 310*a-b*, the user may select one of the hyperlinks 310*a-b* using a tap gesture that includes a single user input. In responding to this tap gesture, the input manager 108 may detect the single input of the input event and channel the input to the HTML content. In one or more embodiments, the HTML content is equipped to handle a single input selecting one or more hyperlinks 310*a-b* and respond to the tap gesture by navigating to a webpage or other source of digital content associated with the selected hyperlink.

While the HTML content is capable of receiving and processing a tap gesture with respect to the hyperlinks 310*a-b*, the digital content 306 may include one or more dead zones or white spaces without a predefined response to a particular user input. For example, as shown in FIG. 3A, the presentation of HTML content includes white space 312 and other areas within the graphical user interface 302 for which the HTML content does not include a predefined response for a tap gesture. In particular, if the user taps the touchscreen 304 over the white space 312, the input manager 108 detects a user input and channels the user input to the HTML content. In response, the HTML content rejects the user input by providing an indication to the input manager 108 that the HTML content has not responded or otherwise rejected the user input. The input manager 108 can then channel the rejected user input to the native container hosting the HTML content and the native container can provide a response to the tap gesture. For example, in response to receiving a user input over the white space 312, the native container can provide one or more menu options via the graphical user interface 302.

Additionally, as shown in FIG. 3A, a user can access a slideshow of digital content 306 may selecting a selectable icon 308. For example, in response to receiving a tap gesture on the touchscreen 304 over the selectable icon 308, the input manager 108 can channel can detect a user input for the tap gesture and selectively channel the user input to the HTML content or the native container in accordance with one or more embodiments described herein. The HTML content can initially receive the user input and respond to the selection of the selectable icon 308 by providing a slideshow of digital content 306 as illustrated in FIG. 3B.

In response to receiving the selection of the selectable icon 308, the client device 100 provides a slideshow including one or more images included within the article titled "10 Best Scenic Hikes in Washington," as shown in FIG. 3A. Additionally, similar to the presentation described above in connection with FIG. 3B, the client device 100 can provide various interactive features via the graphical user interface 302 and the touchscreen 304. For example, a user may navigate through one or more images by swiping left or right across the touchscreen 304. Additionally, the user may exit the slideshow of images and return to the article view as shown in FIG. 3A.

In one or more embodiments, a user can scroll to the next image in the slideshow by swiping a finger or other object to the left across the touchscreen 304. Where the HTML content recognizes this touch gesture, the input manager 108 can channel each input of the swipe gesture to the HTML content for processing a response to the swipe gesture. For example, when the image shown in FIG. 3B is the first photo in a slideshow of ten photos, the user can provide a left swipe touch gesture and the input manager 108 can channel each input of the left swipe touch gesture to the HTML content to process a response of shifting one image to the left and replacing the image with the next image in the slideshow.

Upon reaching the last image in the slideshow, the user can provide a left swipe gesture. Similar to other left swipe gestures, the input manager 108 may initially channel each detected input of the left swipe gesture to the HTML content. Nevertheless, because the slideshow does not include any additional images to the right of the last image, the HTML content may fail to recognize a left swipe touch gesture or fail to include instructions for processing a left swipe touch gesture when the last image of a slideshow is presented via the graphical user interface 302. As such, the input manager 108 may detect a failure of the HTML content to respond to the left swipe gesture and implement an integrated response to the left swipe gesture.

For example, in one or more embodiments, the left swipe gesture includes an initial user input indicating the user's finger coming into contact with the touchscreen 304 and one or more additional inputs indicating movement of the user's finger across the touchscreen 304. Additionally, as the initial contact of the user's finger may correspond to any number of touch gestures that the HTML content is equipped to process (even while the last image of the slideshow is presented via the graphical user interface 302), the input manager 108 would initially channel the first one or more inputs of the left swipe gesture to the HTML content for processing the user input(s). At some point during the left swipe gesture, the HTML content may reject a user input, identify that the series of user inputs corresponds to an invalid touch gesture, or ultimately determine that the native container is better equipped to handle the left swipe gesture. In response, the HTML content rejects the touch gesture and provides an indication of the rejection or makes a call to the input manager 108 to indicate that the HTML content has rejected one or more inputs of the left swipe gesture. Additionally, in one or more embodiments, the HTML content provides information indicating which inputs of the series of inputs has been processed by the HTML content and which of the series of inputs have been rejected.

In response to receiving the indication of the rejection of the user input(s) by the HTML content, the input manager 108 stops channeling the user inputs of the left swipe gesture to the HTML content and determines a point in the series of user inputs where the HTML content rejected the series of inputs. The input manager 108 channels the rejected user input(s), as well as each additional user input in the series of user inputs, to the native container to finish responding to the left swipe gesture. As such, where the user has swiped to the left on the final image in the slideshow, the HTML content may initially respond and, upon determining that the HTML content has rejected the left swipe gesture, the native container may complete the response to the left swipe gesture. Thus, in response to swiping left on the last image of the slideshow, the native container may respond by moving to a next slideshow of a subsequent article in the electronic magazine, return to the magazine view illustrated in FIG. 3A, or provide another response.

Additionally, in one or more embodiments, the HTML content and input manager 108 identify the rejection of one or more inputs in the series of user inputs as early in the input event as possible. For example, as soon as the HTML content determines that an input event corresponds to an invalid touch gesture, the HTML content can inform the input manager 108 of the rejected input(s) so as to avoid passing user inputs through a web thread and then back through a user interface thread for a response. As such, implementing an integrated reaction early in the series of inputs can prevent lag in responsiveness to an input event.

Figure 4:
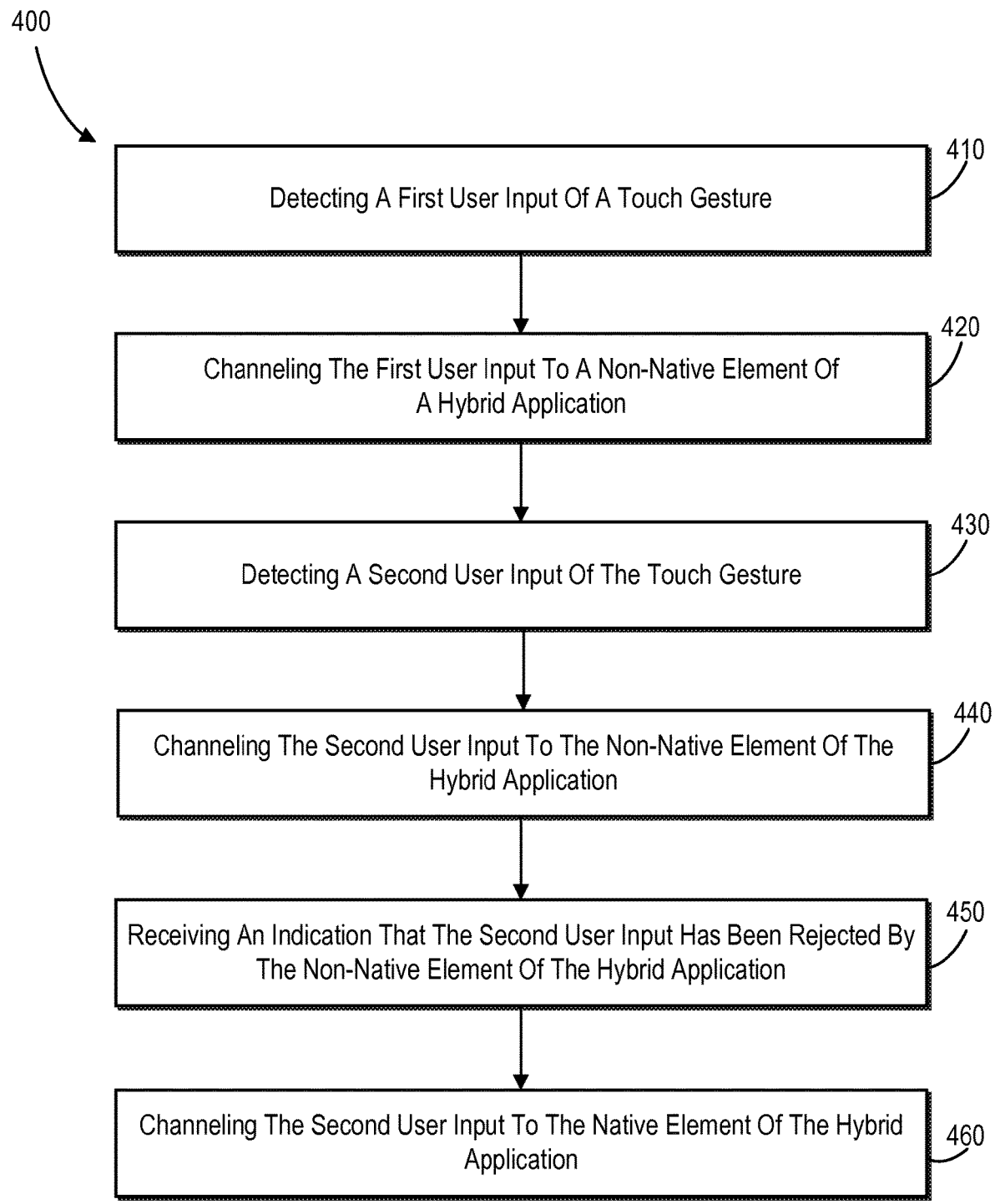
FIG. 4 illustrates a flow chart of a series of acts in a method for receiving and processing one or more user inputs in accordance with one or more embodiments.
Figure 5:
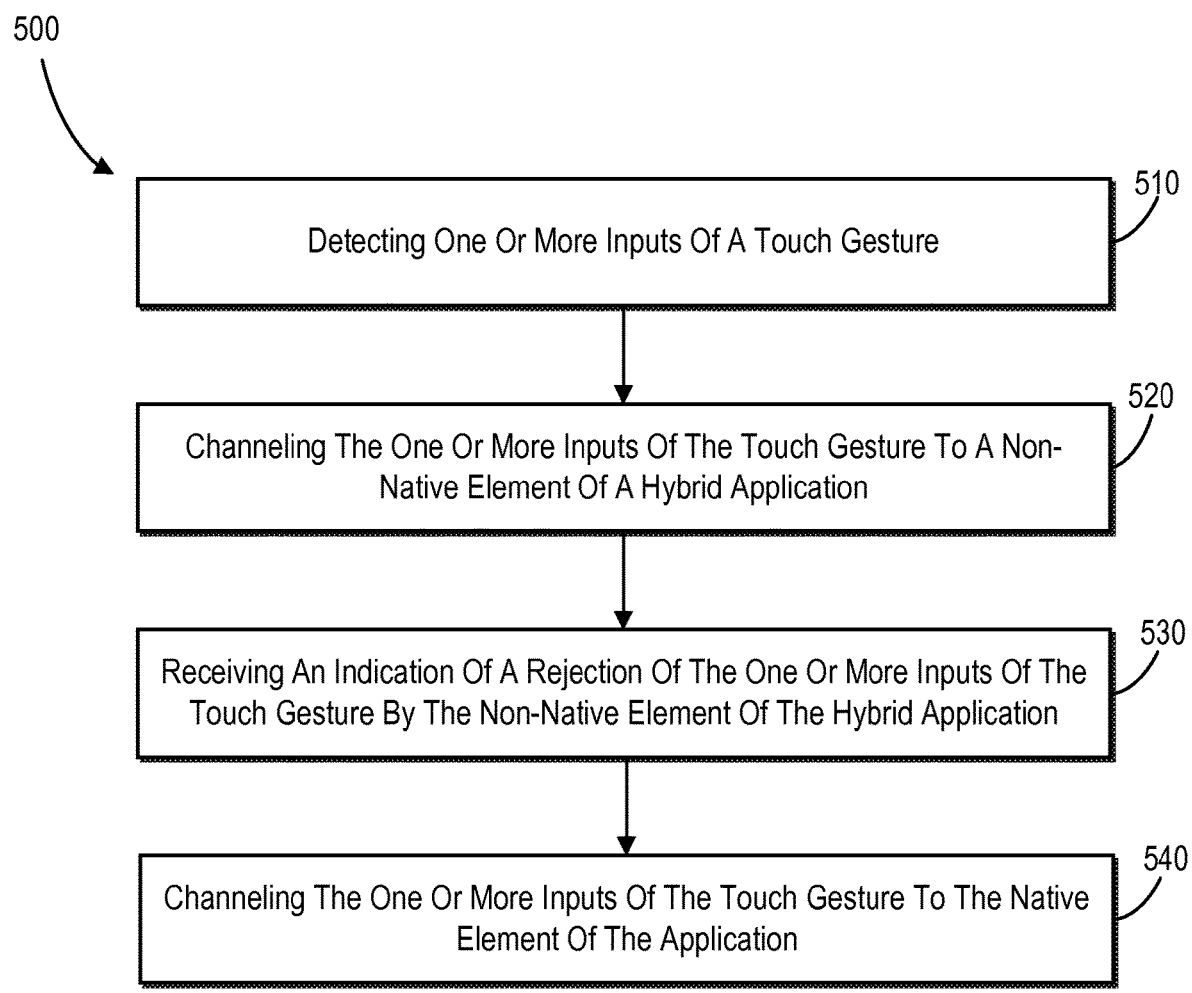
FIG. 5 illustrates a flow chart of a series of acts in a method for receiving and processing one or more user inputs in accordance with one or more embodiments.

FIGS. 1-3B, the corresponding text, and the example, provide a number of different systems and devices for receiving an input event (e.g., a touch gesture) and processing a response to the input event with respect to hybrid applications. In addition to the foregoing, one or more embodiments can also be described in terms of flowcharts comprising acts and steps in a method for accomplishing a particular result. For example, FIGS. 4 and 5 illustrate flowcharts of exemplary methods in accordance with one or more embodiments. The methods described in relation to FIGS. 4 and 5 may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of receiving and processing user inputs. In particular, the method 400 illustrates one embodiment of a method for receiving and processing one or more touch gestures with respect to a graphical user interface on a client device 100. As shown in FIG. 4, the method 400 includes an act 410 of detecting (e.g., by at least one processor) a first user input of a touch gesture with respect to a graphical user interface associated with a hybrid application including a native element and a non-native element. The hybrid application includes a hybrid mobile application on the client device 100 (e.g., a mobile device). Additionally, in one or more embodiments, the non-native element includes HTML content and the native element includes a native container on the client device 100. In particular, the hybrid application may include the HTML content packaged within the native container.

As mentioned above, the touch gesture can include a variety of touch gestures. Examples of touch gestures may include single input touch gestures (e.g., a tap gesture) or multiple-input touch gestures (e.g., a swipe gesture). Additionally, the touch gesture may include a single finger touch gesture (e.g., tap gesture, swipe gesture) or a multiple finger touch gesture (e.g., double-tap gesture, pinch gesture, reverse-pinch gesture). In one example, the touch gesture includes a swipe gesture having multiple inputs. For instance, a first input may refer to an input object (e.g., a finger, stylus) initially coming into contact with a touch-screen interface of the client device 100. A second input may refer to an incremental input or a movement of the input object in a particular direction across the touchscreen interface of the client device 100. Additionally, in one or more embodiments, a touch gesture may include multiple related touch inputs.

The method 400 can further include an act 420 of channeling (e.g., by at least one processor) the first user input to the non-native element of the hybrid application. The act 420 can involve channeling the first user input to the non-native element in accordance with a contract for processing user inputs between the non-native element and the native element of one or more hybrid applications. For example, the contract may refer to an opt-in contract that accesses the hybrid application and governs how inputs are received and provided to the native element and the non-native element of the hybrid application. In one or more embodiments, the contract may further facilitate communication between the hybrid application and an application-programming interface (API) to implement channeling one or more user inputs to the native and/or non-native elements of the hybrid application.

Additionally, the method 400 can include an act 430 of channeling (e.g., by at least one processor) a second input of the touch gesture with respect to the graphical user interface associated with the hybrid application. Further, the method 400 can include an act 440 of channeling the second input of the touch gesture to the non-native element of the hybrid application. The act 440 can involve channeling (e.g., by at least one processor) the first and second inputs to the non-native element over a first channel. For example, the act 440 may involve providing one or more user inputs to a web thread, WebView, WebKit, HTML content, or other web-based component.

The method 400 further includes an act 450 of receiving, from the non-native element of the hybrid application, an indication that the second user input has been rejected by the non-native element of the hybrid application. Receiving the indication that the second user input has been rejected can involve receiving an indication that the non-native element is non-responsive or failed to process a reply to the second user input. In one or more embodiments, receiving the indication that the second user input has been rejected involves receiving an indication that the non-native element has rejected a combination of the first user input and the second user input. Additionally, in one or more embodiments, receiving the indication that the non-native element has been rejected involves receiving an indication that the non-native element relinquishes control of the touch gesture and/or any additional user inputs associated with the first user input and the second user input.

The method 400 further includes an act 460 of channeling, (e.g., by the at least one processor) in response to receiving the indication that the second user input has been rejected by the non-native element of the hybrid application, the second user input to the native element of the hybrid application. The act 460 can involve channeling the second input to the native element over a second channel. For example, the act 460 may involve providing one or more user inputs to a custom native container, a viewer, or other container on the client device 100.

Additionally, while not shown in FIG. 4, the method 400 can further include an act of detecting one or more additional user inputs of the touch gesture and channeling the additional user input(s) of the touch gesture to the native element of the hybrid application. In one or more embodiments, the method 400 includes an act of channeling any additional user inputs of the touch gesture until detecting an end of the touch gesture or input event including one or more touch gestures. Additionally, in one or more embodiments, the method 400 further includes an act of excluding one or more additional inputs (e.g., any inputs of the touch gesture after the second user input) from being channeled to the non-native element of the hybrid application.

FIG. 5 illustrates a flowchart of one example method 500 of receiving and processing user inputs. In particular, the method 500 illustrates one embodiment of a method for receiving and processing one or more touch gestures with respect to a graphical user interface on a client device 100. As shown in FIG. 5, the method 500 includes an act 510 of detecting (e.g., by at least one processor), one or more inputs of a touch gesture with respect to a graphical user interface associated with a hybrid application. The hybrid application includes a native element and a non-native element. For example, the native element may include a native container and the non-native element may include HTML content.

As shown in FIG. 5, the method 500 includes an act 520 of channeling (e.g., by at least one processor) the one or more inputs of the touch gesture to the non-native element of the hybrid application. The method 500 further includes an act 530 of receiving, from the non-native element of the hybrid application, an indication of a rejection of the one or more inputs of the touch gesture. Further, the method 500 includes an act 540 of channeling (e.g., by at least one processor), in response to receiving the indication of the rejection of the one or more inputs of the touch gesture, the one or more inputs of the touch gesture to the native element of the application.

In one or more embodiments, the method 500 includes an act of channeling a first plurality of user inputs of the touch gesture to the non-native element of the hybrid application. For example, the method 500 can include an act of channeling a first portion of a touch gesture to the non-native element until one or more of the user inputs of the touch gesture are rejected by the non-native element. Additionally, the method 500 can include an act of channeling a second plurality of user inputs of the touch gesture (e.g., a second portion of the touch gesture) to the native element of the hybrid application. For example, the method 500 can include an act of re-routing or directing inputs from the non-native element to the native element of the hybrid application in the middle of a touch gesture that includes multiple user inputs.

Additionally, in one or more embodiments, the method includes an act of channeling the one or more user inputs to the non-native element of the hybrid application in accordance with a default input state. For example, the input state may refer to a particular channel or destination (e.g., the non-native element or the native element) of a user input. Thus, a default setting of a contract governing the method 500 of receiving and processing user inputs can involve initially channeling each user input of a touch gesture to the non-native element of the hybrid application. Additionally, while the method 500 may include changing an input state to channel user inputs to the native element of the hybrid application, one or more embodiments of the method 500 include an act of reverting to the default input state upon detecting a completion of a touch gesture or other input event including multiple touch gestures. As such, in one or more embodiments, the method 500 can include an act of detecting at least one input of a second touch gesture with respect to the graphical user interface associated with the hybrid application and, in accordance with reverting to the default input state, channeling the at least one input of the second touch gesture to the non-native element of the hybrid application.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 6:
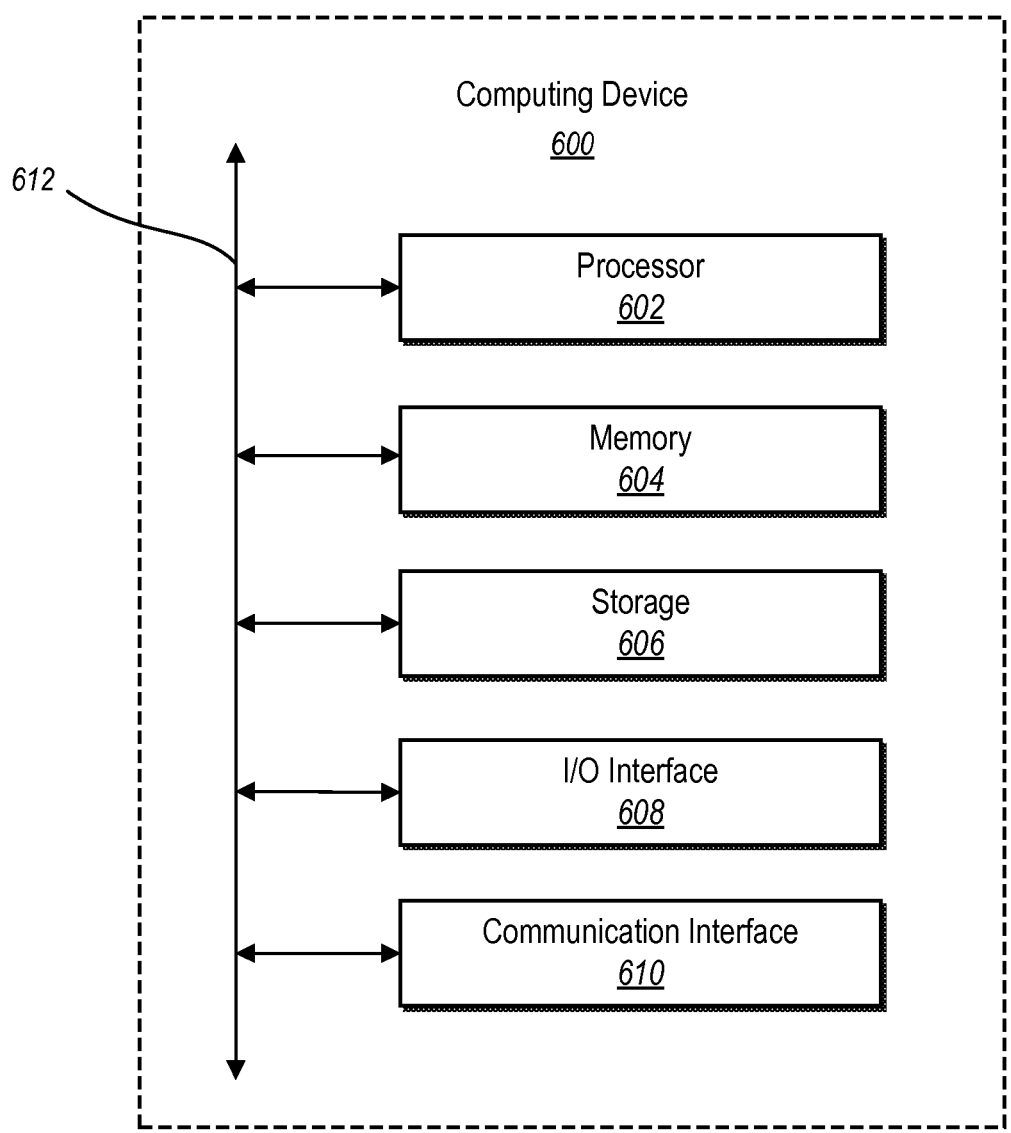
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that the client device 100 may be implemented by one or more computing devices such as the computing device 600. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 7, the components illustrated in FIG. 6 are not intended to be limiting. Additional or alternative components may be used in other embodiments. Furthermore, in certain embodiments, the computing device 600 can include fewer components than those shown in FIG. 7. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or an universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") calling technologies, Long Term Evolution ("LTE") technologies, wireless communication technologies, in-band and out-of-band calling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computer system to:
    detect a first portion of a touch gesture with respect to a graphical user interface associated with a hybrid application, the hybrid application comprising a non-native element and a native element;
    channel the first portion of the touch gesture to the non-native element of the hybrid application, wherein the non-native element of the hybrid application performs a non-native function in response to processing the first portion of the touch gesture;
    detect a second portion of the touch gesture with respect to the graphical user interface associated with the hybrid application;
    channel the second portion of the touch gesture to the non-native element of the hybrid application;
    receive, from the non-native element of the hybrid application, a processing failure rejection indication that the second portion of the touch gesture has been rejected by the non-native element of the hybrid application;
    channel, in response to receiving the processing failure rejection indication that the second portion of the touch gesture has been rejected by the non-native element of the hybrid application, the second portion of the touch gesture to the native element of the hybrid application;
perform, by the native element of the hybrid application, a native function in response to processing the second portion of the touch gesture;
channel a third portion of the touch gesture associated with the first portion of the touch gesture and the second portion of the touch gesture to the native element of the hybrid application; and
exclude the third portion of the touch gesture associated with the first portion of the touch gesture and the second portion of the touch gesture from being channeled to the non-native element of the hybrid application.

2. The non-transitory computer readable medium of claim 1, wherein:
the hybrid application resides on a client device associating with a user providing the touch gesture; and
the non-native element of the hybrid application comprises Hypertext Markup Language (HTML) content.

3. The non-transitory computer readable medium of claim 2, wherein the native element of the hybrid application comprises a native container stored on a client device.

4. The non-transitory computer readable medium of claim 1, wherein:
the touch gesture comprises a swipe gesture;
the first portion of the swipe gesture corresponds to an input object coming into contact with a touchscreen interface; and
the second portion of the swipe gesture corresponds to a direction of the input object with respect to the touchscreen interface.

5. The non-transitory computer readable medium of claim 1, wherein the instructions, when executed by the at least one processor, cause the computer system to channel the first portion of the touch gesture to the non-native element of the hybrid application by channeling the first portion of the touch gesture to the non-native element of the hybrid application in accordance with a contract for processing portion of the touch gestures between the non-native element and the native element of the hybrid application.

6. The non-transitory computer readable medium of claim 1, wherein the instructions, wherein the processing failure rejection indication indicates that the non-native element of the hybrid application has relinquished control over processing the second portion of the touch gesture after failing to process.

7. The non-transitory computer readable medium of claim 1, wherein the instructions, wherein the processing failure rejection indication indicates that the non-native element of the hybrid application has detected that the second portion of the touch gesture is an invalid touch gesture.

8. The non-transitory computer readable medium of claim 1, wherein the instructions, wherein the processing failure rejection indication indicates that the non-native element of the hybrid application has become non-response upon attempting to process the second portion of the touch gesture.

9. A method for receiving and processing touch inputs received via a touchscreen interface of an electronic computing device, the touch inputs received by the electronic computing device for execution by a hybrid computing application, the method comprising:
detecting, by at least one processor, a plurality of inputs of a touch gesture with respect to a graphical user interface associated with a hybrid application, the hybrid application having a non-native element and a native element, wherein the plurality of inputs of the touch gesture comprises a first portion and a second portion;
channeling, by the at least one processor and in accordance with a default input state, the plurality of inputs of the touch gesture to the non-native element of the hybrid application, wherein the non-native element of the hybrid application performs a non-native function in response to processing a subset of the plurality of inputs of the touch gesture;
receiving, from the non-native element of the hybrid application, a processing failure rejection indication of a rejection of the second portion of the plurality of inputs of the touch gesture;
channeling, by the at least one processor and in response to receiving the processing failure rejection indication of the rejection of the second portion of the touch gesture, the second portion of the touch gesture to the native element of the application;
performing, by the native element of the application, a native function in response to the second portion of the touch gesture;
channel a third portion of the plurality of inputs of the touch gesture associated with the first portion of the touch gesture and the second portion of the touch gesture to the native element of the hybrid application; and
exclude the third portion of the touch gesture associated with the first portion of the touch gesture and the second portion of the touch gesture from being channeled to the non-native element of the hybrid application.

10. The method as recited in claim 9, wherein:
channeling the plurality of inputs of the touch gesture to the non-native element of the hybrid application comprises channeling the first portion and the second portion of the plurality of inputs of the touch gesture over a first channel associated with the non-native element of the hybrid application, the first channel comprising a web-based component; and
channeling the plurality of inputs of the touch gesture to the native element of the hybrid application comprises channeling the second portion of the plurality of inputs over a second channel associated with the native element of the hybrid application, the second channel comprising a container on a client device.

11. The method as recited in claim 9, wherein the touch gesture comprises a swipe gesture.

12. The method as recited in claim 9, wherein the touch gesture comprises a plurality of related touch inputs, each touch input comprising at least one of the plurality of inputs of the touch gesture.

13. The method as recited in claim 9, wherein the default input state comprises a default state of a contract governing receipt and processing of user inputs received in connection with the hybrid application.

14. The method as recited in claim 13, further comprising, upon completion of the touch gesture, reverting to the default input state.

15. The method as recited in claim 14, further comprising:
detecting at least one input of a second touch gesture with respect to the graphical user interface associated with the hybrid application; and
channeling the at least one input of the second touch gesture to the non-native element of the hybrid application in accordance with reverting to the default input state.

16. The method as recited in claim 9, wherein:
channeling the plurality of inputs of the touch gesture to the non-native element of the hybrid application comprises channeling a first plurality of user inputs of the touch gesture to the non-native element of the hybrid application; and
channeling the plurality of inputs of the touch gesture to the native element of the hybrid application comprises channeling a second plurality of user inputs of the touch gesture to the native element of the hybrid application.

17. A computing device comprising:
at least one processor; and
a non-transitory computer-readable storage medium storing instructions thereon that, when executed by the at least one processor, cause the computing device to:
detect a first portion of a touch gesture with respect to a graphical user interface associated with a hybrid application, the hybrid application comprising a non-native element and a native element;
channel the first portion of the touch gesture to the non-native element of the hybrid application, wherein the non-native element of the hybrid application performs a non-native function in response to processing the first portion of the touch gesture;
detect a second portion of the touch gesture with respect to the graphical user interface associated with the hybrid application;
channel the second portion of the touch gesture to the non-native element of the hybrid application;
receive, from the non-native element of the hybrid application, a processing failure rejection indication that the second portion of the touch gesture has been rejected by the non-native element of the hybrid application;
channel, in response to receiving the processing failure rejection indication that the second portion of the touch gesture has been rejected by the non-native element of the hybrid application, the second portion of the touch gesture to the native element of the hybrid application; and
perform, by the native element of the hybrid application, a native function in response to processing the second portion of the touch gesture;
channel a third portion of the touch gesture associated with the first portion of the touch gesture and the second portion of the touch gesture to the native element of the hybrid application; and
exclude the third portion of the touch gesture associated with the first portion of the touch gesture and the second portion of the touch gesture from being channeled to the non-native element of the hybrid application.

18. The computing device of claim 17, wherein:
the hybrid application resides on a client device associating with a user providing the touch gesture; and
the non-native element of the hybrid application comprises Hypertext Markup Language (HTML) content.

19. The computing device of claim 18, wherein the native element of the hybrid application comprises a native container stored on a client device.

20. The computing device of claim 17, wherein:
the touch gesture comprises a swipe gesture;
the first portion of the swipe gesture corresponds to an input object coming into contact with a touchscreen interface; and
the second portion of the swipe gesture corresponds to a direction of the input object with respect to the touchscreen interface.

* * * * *